US005314654A

United States Patent [19]

Gunderson et al.

[11] Patent Number: 5,314,654

[45] Date of Patent: May 24, 1994

[54] METHOD FOR FORMING STRUCTURAL COMPONENTS FROM DRY WOOD FIBER FURNISH

[75] Inventors: Dennis E. Gunderson, Madison; Roland L. Gleisner, Jefferson, both of Wis.

[73] Assignee: The United States of America as represented by the Secretary of Agriculture, Washington, D.C.

[21] Appl. No.: 976,821

[22] Filed: Nov. 16, 1992

Related U.S. Application Data

[62] Division of Ser. No. 675,979, Mar. 25, 1991, Pat. No. 5,198,236.

[51] Int. Cl.[5] .......... B29C 43/02

[52] U.S. Cl. .......... 264/517; 264/119; 264/120

[58] Field of Search .......... 264/517, 120, 119, 121

[56] References Cited

U.S. PATENT DOCUMENTS

| | | | |
|---|---|---|---|
| 2,257,112 | 9/1941 | Forster | 154/28 |
| 2,725,601 | 12/1955 | Brenner | 19/148 |
| 3,177,275 | 4/1965 | Brenner | 264/128 |
| 3,428,518 | 2/1969 | Schafer | 161/170 |
| 3,939,240 | 2/1976 | Savich | 264/91 |
| 4,005,957 | 2/1977 | Savich | 425/80 |
| 4,289,793 | 9/1981 | Gustafson et al. | 426/491 |
| 4,592,708 | 6/1986 | Feist et al. | 425/80.1 |
| 4,624,819 | 11/1986 | Hartog et al. | 264/510 |
| 4,666,647 | 5/1987 | Enloe et al. | 264/121 |
| 4,702,870 | 10/1987 | Setterholm et al. | 264/87 |
| 4,753,713 | 6/1988 | Gunderson | 162/383 |
| 4,859,388 | 8/1989 | Peterson et al. | 264/121 |

*Primary Examiner*—Mary Lynn Theisen
*Attorney, Agent, or Firm*—M. Howard Silverstein; John D. Fado; Janet I. Stockhausen

[57] ABSTRACT

An improved method and apparatus for dry forming adhesive coated wood fibers in an airstream in a particular mold apparatus. The invention includes a particular sequence of steps and related apparatus, and permits the manufacturer of a mat of differing cross-sectional shapes but of uniform density. The invention includes the advantageous steps of final curing of the mat off of the main molding apparatus, thus achieving efficiencies in use.

10 Claims, 13 Drawing Sheets

METHOD FOR FORMING STRUCTURAL COMPONENTS FROM DRY WOOD FIBER FURNISH

This is a division of application Ser. No. 07/675,979 filed Mar. 25, 1991 now U.S. Pat. No. 5,198236.

FIELD OF THE INVENTION

This invention relates to the production of structural components from dry wood fiber using an air or vacuum deposition technique. The invention pertains to methods and apparatus for producing such components having a non-uniform cross-sectional area, but a uniform density throughout.

BACKGROUND OF THE INVENTION

The present invention pertains to forest products and particularly to the use of wood fibers.

Trees in the USA are of two general types for commercial purposes, hardwoods and softwoods. The softwoods are well utilized for the manufacture of newsprint, paper and the like paper products. Hardwoods, in the larger trees, are well utilized for the production of lumber.

However, the hardwood category also includes large numbers of relatively small trees, trees that are deformed or are otherwise not well shaped to produce commercial sizes and quantities of lumber, and the relatively larger as well as the smaller limbs of the larger hardwood trees which are not utilizable for lumber. The present invention is directed towards utilization of this resource.

That is, softwood production is well spoken for and most of the hardwood production is spoken for. It is the part of the hardwood production which is not otherwise usable at present which is usable in accordance with the invention to produce structural material such as panels with texturized surfaces and other objects of a particular category.

The prior art has been aware of certain problems in the use of hardwood fiber in methods such as the present invention that involve pressing of the fibers into products. Hardwoods tend to have short and thick walled fibers. These short thick walled fibers, when used in conventional processes of the same general category as the present invention and in paper making, tend to bond to each other only poorly, and, especially important as to paper, tend to exhibit poor tear strength and an abundance of natural and generated fine material that causes drainage problems resulting in low wet web strength. In the present state of the art, hardwood pulps are used primarily only as a filler and as a means to provide smoother surfaces on paper for printing.

Because of these problems, utilization of hardwoods of lower than lumber quality as set forth above has not occurred. This results in a good deal of waste of these lower quality hardwoods resulting in added pressure on softwood production.

In the prior art of the utilization of such wood fiber, the techniques utilized basically fall into two categories, using the fibers when they are wet, and using them when they are dry. The present invention is a dry or air as opposed to water deposition type of process.

The invention uses bonding techniques to form the final structural members. Wet techniques tend to be slower, involve many steps including those to drain the water used for the forming and to dry. These steps are all avoided with dry forming techniques such as the present invention.

Finally as to the prior art, attention is invited to two earlier patents, U.S. Pat. No. 4,702,870 issued Oct. 27, 1987 to Setterholm and Hunt; and U.S. Pat. No. 4,753,713 issued Jun. 28, 1988 to the present inventor, Dennis Gunderson. Both of these patents are owned by the U.S. Government, Secretary of Agriculture on behalf of the U.S. Forest Service.

Gunderson U.S. Pat. No. 4,753,713 teaches forming of a uniform density mat by draining a fiber bearing slurry through porous mandrels, and subsequent consolidation of the web in the mold. In U.S. Pat. No. 4,702,870, Setterholm and Hunt teach the wet-forming of a mat of variable cross-section on a support of resilient deformable mold inserts or "nubs" on a forming wire. They show how the web can be molded directly on the nubs and then consolidated as web and resilient inserts are pressed together under pressure applied normal to the surface of the web.

The present invention distinguishes from U.S. Pat. No. 4,753,713 in that: (1) the present invention is an air-forming and not a wet-forming method, (2) the present invention is not limited to drying on the mold, but provides means to remove the web from the mold and complete consolidation and cure thereof remote from the porous mandrels. The present invention distinguishes from Setterholm and Hunt in U.S. Pat. No. 4,702,870 in that the web is not formed on the resilient deformable blocks as taught by them—nor is it wet formed. Further, in the present invention, it is the protrusions in the forming apparatus which are porous whereas in Setterholm and Hunt it is the base material which is porous. In the present invention, there is significant one-dimensional (thickness direction) consolidation of the web on the mandrels. This is very significant because it permits the forming of much deeper sections (greater variations in cross-section) than is possible with the methods taught by Setterholm and Hunt. Moreover, the present invention teaches means to achieve further one-dimensional consolidation of the web even after the resilient pillows have been inserted in the web. The withdrawal of the solid block into the support plate (one-dimensional consolidation) prior to the distortion of the resilient pillows (three-dimensional consolidation) is not taught by Setterholm and Hunt.

A dry formed web cannot be adequately consolidated in the forming apparatus and the means to proceed with further consolidation and curing are not obvious from these prior patents. The present invention teaches a novel means to contain and support the web when the forming mandrel is withdrawn. Further, the invention teaches a novel means to proceed with consolidation of the web after it is removed from the mandrels.

SUMMARY AND ADVANTAGES OF THE INVENTION

The present invention provides means to produce sculptured structural fiberboard products using a mold that includes porous forming areas that in one embodiment are porous mandrels movably mounted in the mold. Forming is done with adhesive-coated, dry wood fibers carried by air. The thick, low density mat of fibers so deposited by the air is consolidated to form a sculptured mat of uniform high density. Final densification of the mat and activation of the adhesive is performed off the mold, i.e., not on the mandrels, in a manner which lends itself to mass production processes.

The invention provides such a method for making such products using a dry forming technique, thus avoiding all of the problems and disadvantages in wet forming techniques.

In an alternative embodiment, the present invention teaches further novel means to integrate the rigid blocks and resilient pillows with the retractable porous mandrels in a way that reduces the number of separate operations and handling required in the process. This embodiment is also advantageous in that it provides support to that portion of the web which is most susceptible to "springback" when the mandrels are withdrawn.

The invention manifests itself in a particular sequence of steps to produce such products and to achieve these advantages. These steps are:

1. A first vacuum deposit of relatively small amount of fiber.

2. Pressure on that first deposit including opening the vacuum head of the special machine to perform this step.

3. A second vacuum deposit of the remaining fiber.

4. Pressing on that, combined with retracting the porous mandrels to get the main compression, this step being performed with an atmospheric pressure assist due to the further application of vacuum pressure.

5. Removal of the frame with the compressed mat thereon. The main equipment is thus released to repeat steps 1–4, while the remaining steps summarized in 6 following are performed off the main equipment.

6. Using pillows, blocks, more pressure, and heat to produce the final product, off of the main mold.

Another feature of the invention is the coordination of the movement of the platen and the mandrels in such a way as to compress the face and the ribs of the product being produced to the same level of compression. This will produce the desired sculptured product having varying cross-sectional sizes but having the same density throughout.

Thus, an important advantage of the invention overall is the use of a dry technique to produce structural members from dry wood fibers having non-uniform cross-sections, but uniform density.

Another advantageous feature of the invention is the means to provide coordinated movement of the mandrels and the pressing platen in such a way as to produce the above described new product.

Another advantage of the invention is the method and apparatus of removing the web from the mold while it is contained in relatively low cost parts. This permits final densification and curing of the web in low cost components, while releasing the remaining main portions of the mold to produce new webs.

Another advantage of the invention is its use of particular elastic pillows and rigid blocks to produce this uniform densification with dis-uniform cross-sectional shapes in a dry forming technique.

Finally, the invention accomplishes the above by the provision of a particular combination of steps in its method.

Thus, in summary, there is provided an important step forward in this art, wherein a contoured or sculptured mat of varying cross-sections is air or vacuum formed using pretreated dry fiber furnish. It is believed that such a process has been heretofore unknown in the prior art.

BRIEF DESCRIPTION OF THE DRAWINGS

This invention will be more clearly understood with reference to the accompanying drawings, which drawings also form a part of this disclosure, and wherein.

DETAILED DESCRIPTION OF THE PREFERRED EMBODIMENTS

Figure 1:
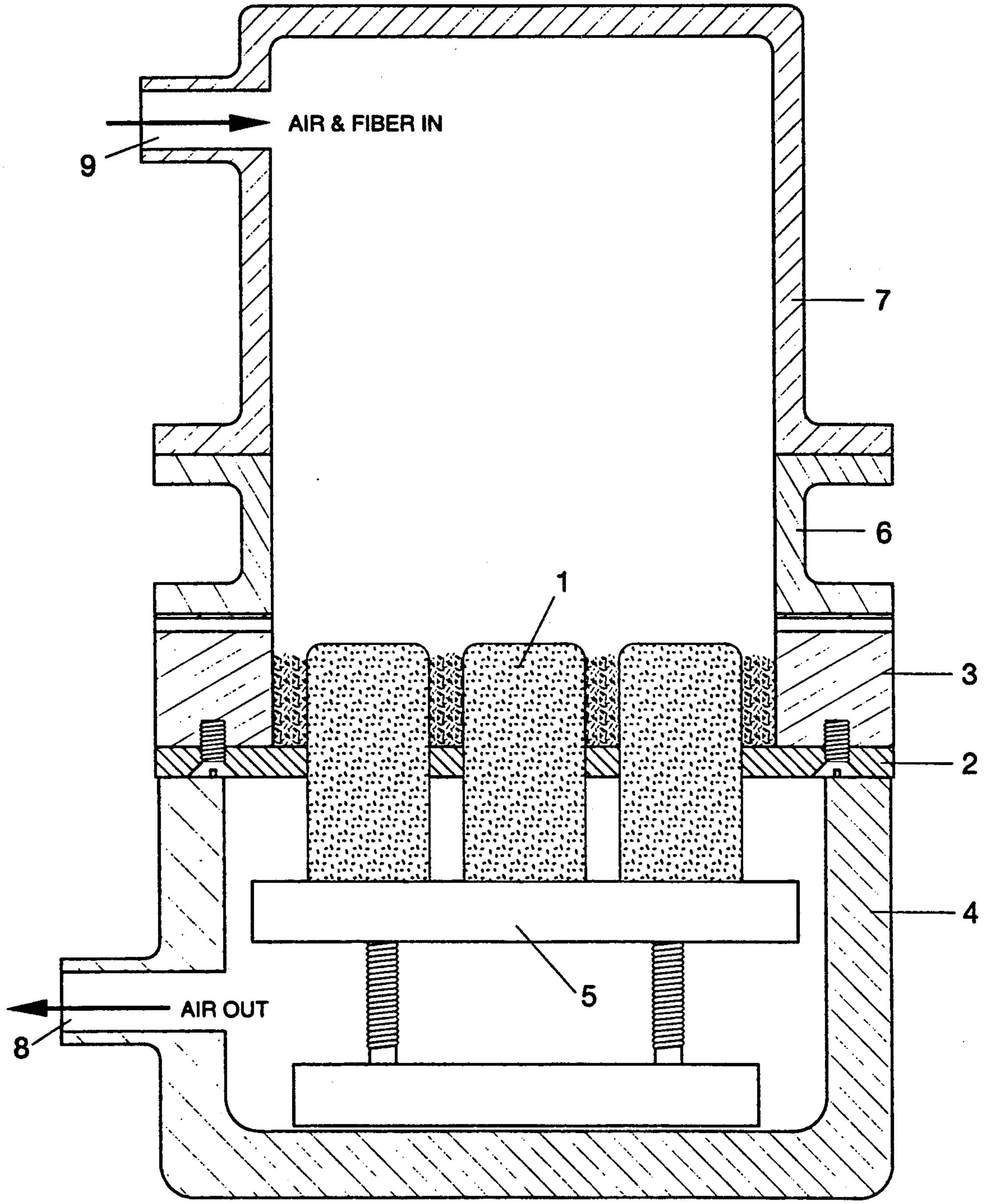
FIGS. 1-10 are a sequence of schematic drawings which illustrate the primary method of the invention.

In FIG. 1 there is shown a molding apparatus according to the invention comprising porous mandrels 1, perforated plate 2, frame 3, base 4, and elevator assembly 5 at a forming station also comprising sideboards 6 and 7. The mandrels 1 may be made of sintered bronze. A vacuum drawn at port 8 in the base 4 causes air to be drawn in at port 9, into hood 7, and thence through the porous mandrels 1 into the interior of base 4. Fiber entering port 9 carried by the air flow is deposited on the surfaces of the partially retracted mandrels 1 so as to fill the spaces between the mandrels, as shown.

A fundamental problem in creating a deeply sculptured dry-formed panel or the like as is done with the present invention is that of depositing enough fiber into the rib sections. Because air laid mats tend to be of very low density prior to compaction, an air formed mat of fibers may be from five to ten times thicker than the thickness of the finished, compacted, cured panel. In the case where one is attempting to form a narrow rib structure, the problem is especially difficult because the deep mat of fiber must be formed in the narrow gaps between mandrels. The natural tendency of the dry wood fiber is to cling together, thus bridging the space between the mandrels rather than be drawn into it in sufficient quantity. The greater the fiber length, the greater the tendency to "cling" and "bridge". The process steps illustrated in FIGS. 1, 2, and 3 overcome this difficulty and allow the invention to form (deposit) as much fiber as desired in the ribs.

Figure 2:
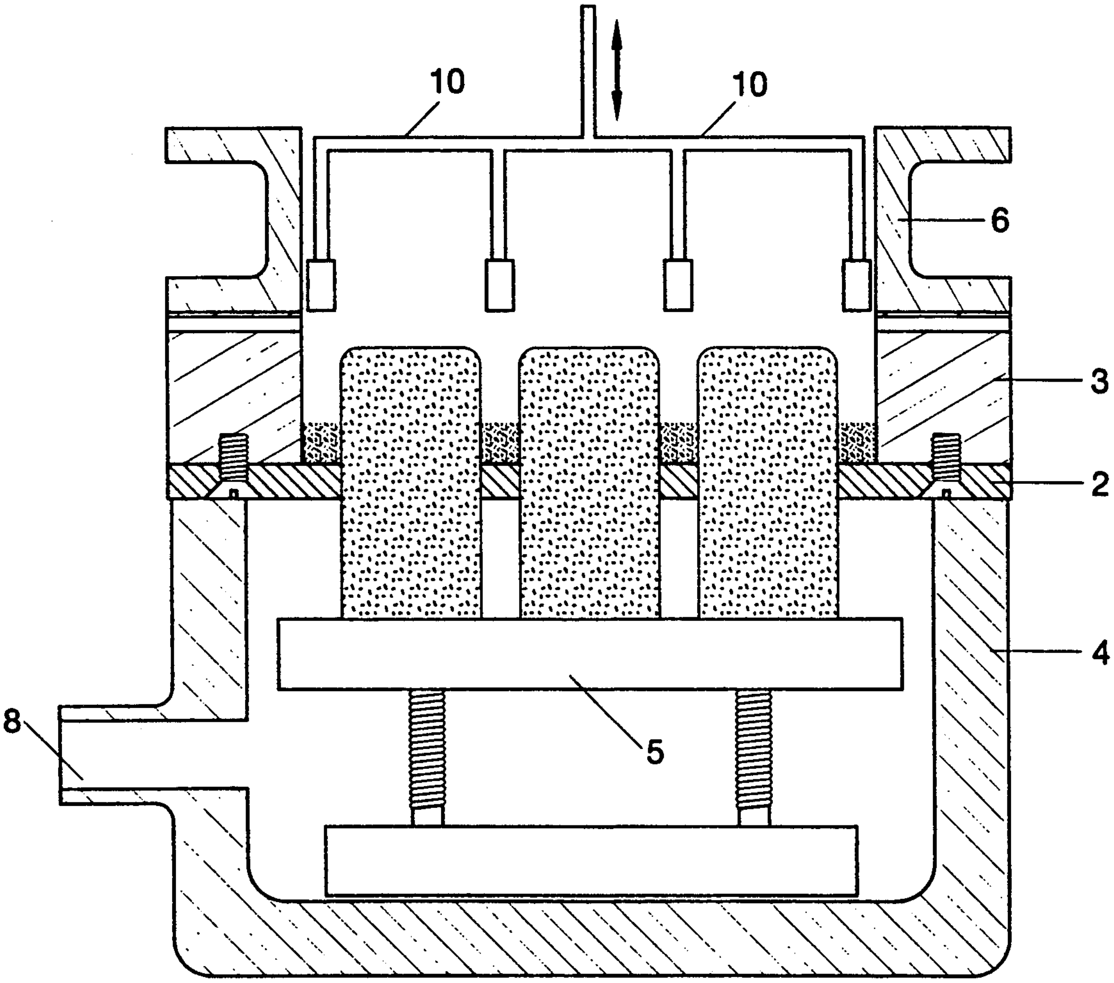
Figure 3:
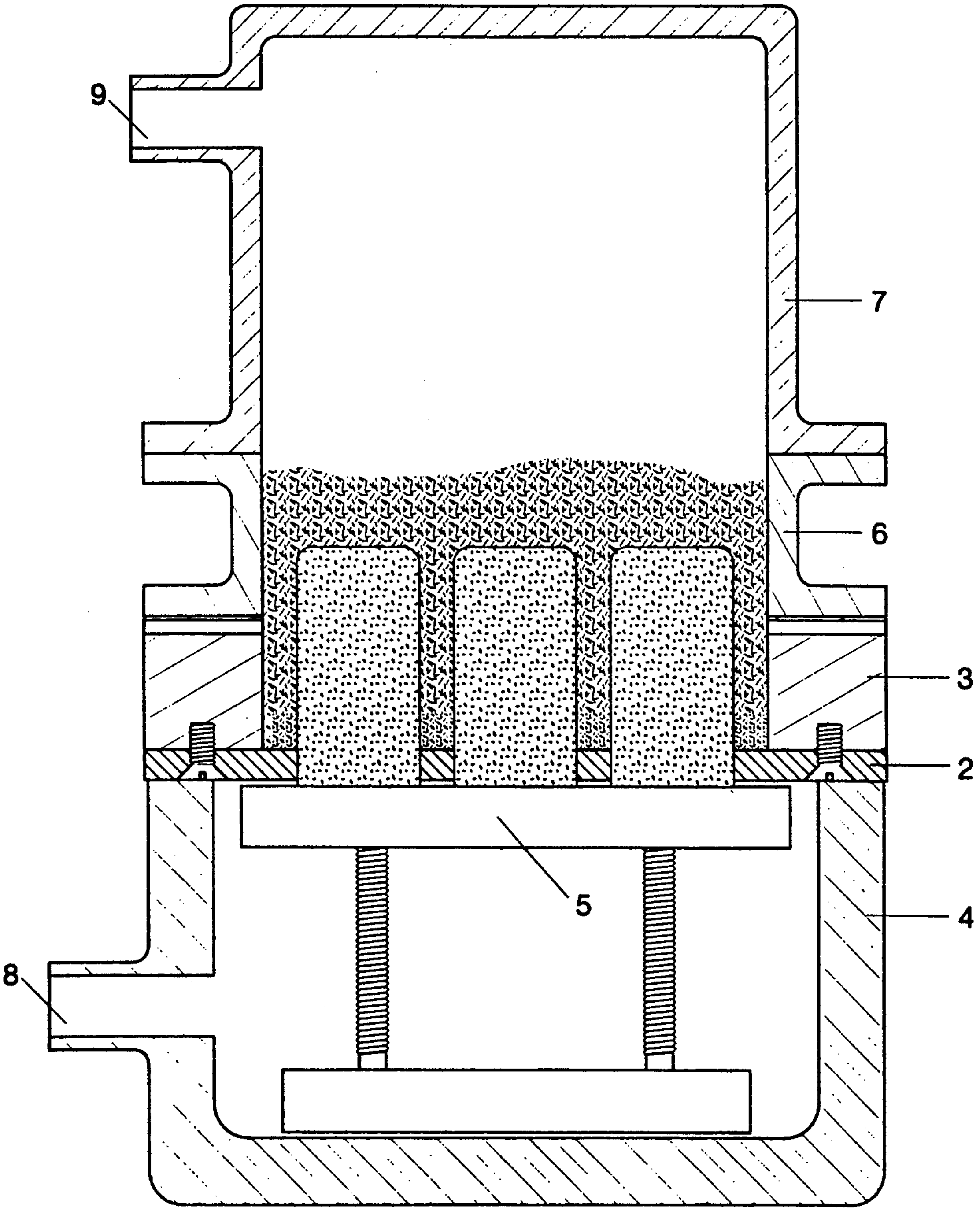

The process depicted in FIGS. 1-3 is a simplification in two ways: (1) the mandrels may in fact be raised in several steps with compaction of the web prior to each raising of the mandrels, and (2) the compacting grid 10 would in practice be preferably located within the hood 7. It is not difficult to envision in FIG. 3, for example, that the top of the hood 7 could be higher than shown to accommodate the compacting grid 10 and a suitable actuator without interfering with the forming process. In such a configuration, several steps of fiber deposition, compaction and raising of the mandrels could be conveniently implemented without removing the forming hood 7.

Note that the "fingers" of the compacting grid 10 need not be fit tight between the mandrels to be effective. Here the tendency of the fibers to cling and form a network is an advantage. The fiber being compacted does not try to escape through the clearance spaces between the compacting grid fingers 10A and the mandrels due to this cling tendency.

The advantage of the two-step or multi-step fill and compact process of this invention is that it gets an adequate quantity of fiber into otherwise very difficult to form sections. Because the depth of the section formed at any one time in the process is relatively small, the invention gets uniform, even, dependable distribution of fiber in the rib sections. The invention also greatly reduces the potential for a void somewhere in the rib caused by bridging, a condition which would likely be cause for rejection of the final panel. Finally, this part of the method of the invention makes possible the formation of very deep sections, which would not be possible using an array of stationary mandrels.

In FIG. 2, the forming hood 7 has been removed to provide access to the mandrels 1 and a compacting grid 10 has been positioned over the mandrels. The compacting grid need fit only loosely into the spaces between the mandrels because the fibers naturally tend to cling together even when dry, as discussed above. When pushed into these spaces, the grid compacts the low density web of fibers pictured in FIG. 1 to the condition shown in FIG. 2, which is the first compaction step according to the invention. Multiple such "first" compaction steps are also possible, as discussed herein.

In FIG. 3 the forming hood 7 is again positioned over the side boards 6. The elevator assembly 5 has been raised to fully project the mandrels into the chamber defined by the frame 3 and side boards 6. A vacuum is drawn at port 8 in the base 4 to cause more air and fiber to enter port 9 in the forming hood 7. This added fiber is deposited in a low density mat between, and over the tops of, the porous mandrels 1, and on top of the partially compacted fibers, as shown. This is the "second" vacuum deposition step according to the invention.

Figure 4:
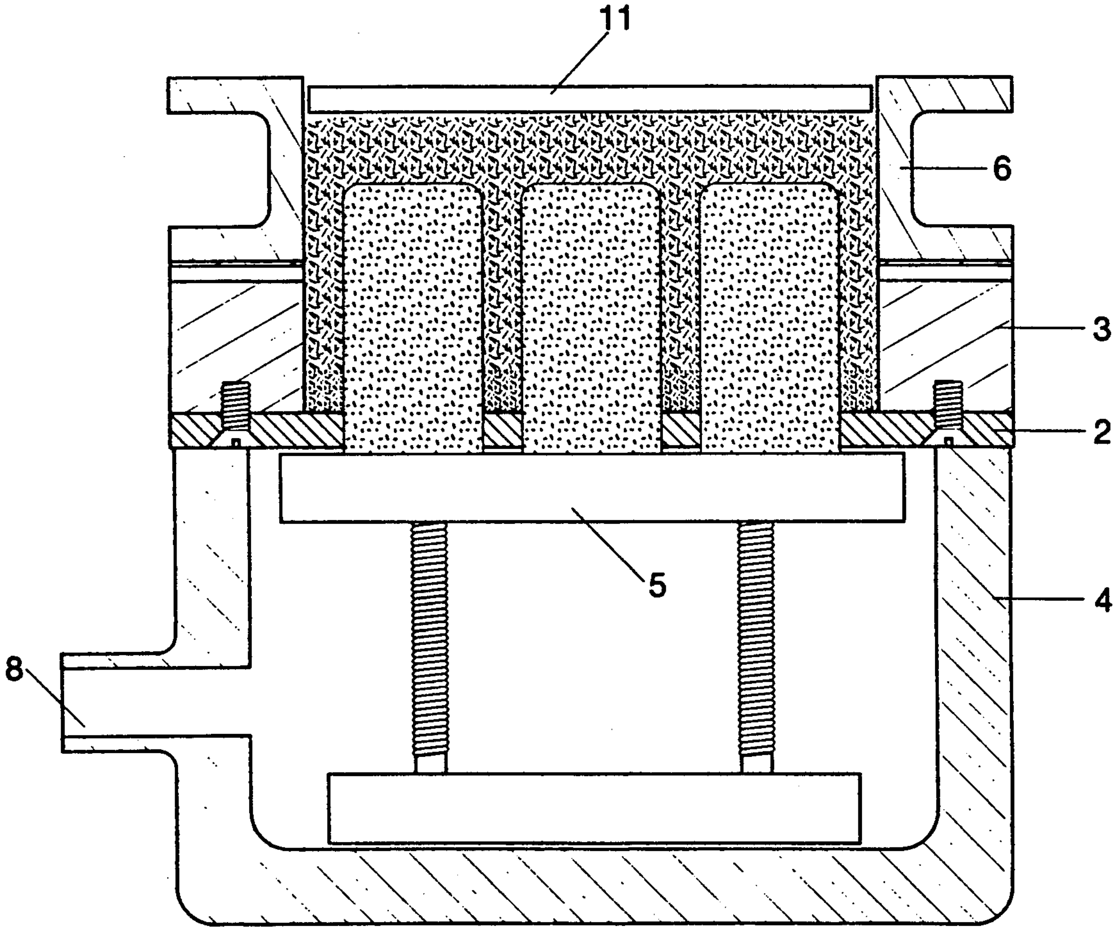

In FIG. 4 the forming hood 7 has been again removed and a flat platen 11 has been placed on the fiber mat within the confines of the side boards 6.

Figure 5:
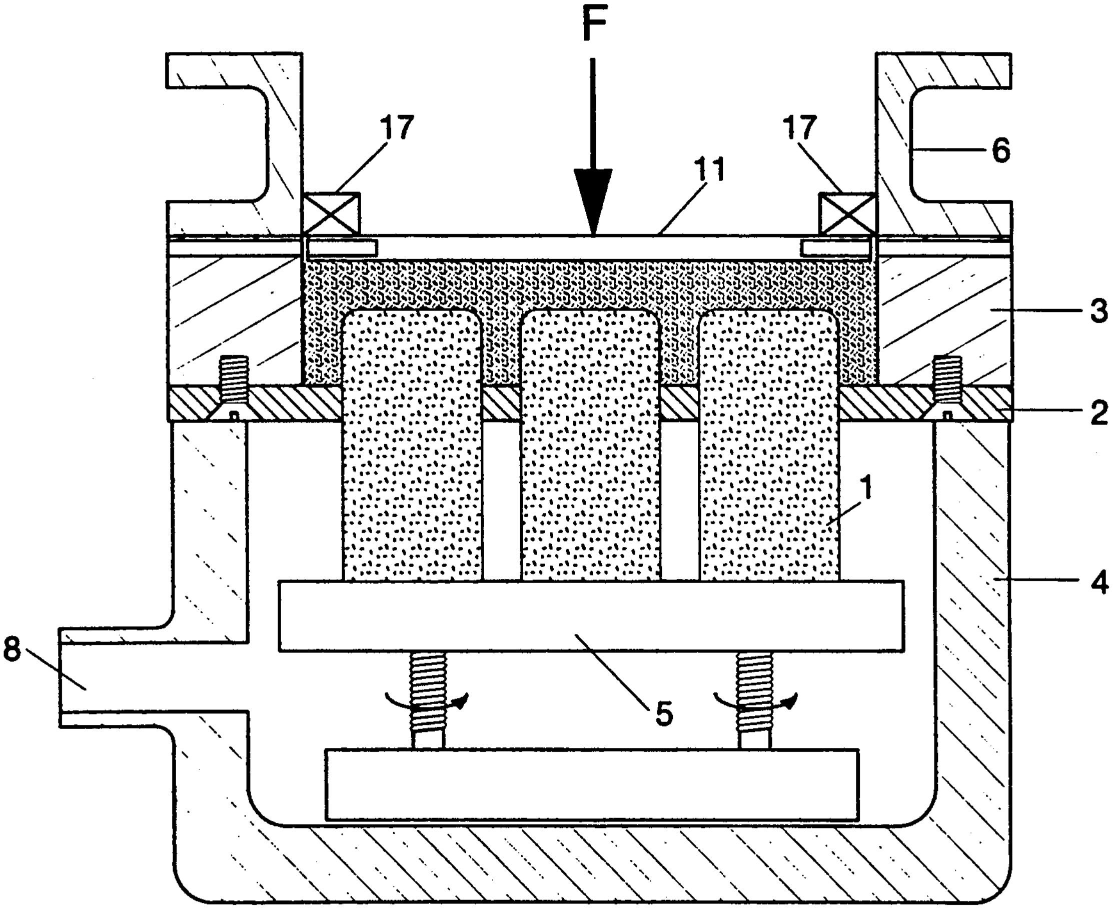

FIG. 5 depicts the initial consolidation of the air-formed low density fiber structure. The platen 11 is forced downward, as shown by the large arrow F, and the mandrels 1 are withdrawn through the perforated plate 2 by action of the elevator assembly 5. The volume of the fiber web contained by the perforated plate 2, frame 3, and platen 11 is reduced and its density, therefore, increased. The downward force required to compact the web (represented by arrow F in FIG. 5) may be imposed by an actuator external to the mold assembly.

Alternatively, an effective web consolidation force of 10-12 psi can be achieved by drawing vacuum at port 8 via the porous mandrels. When the apparatus is operated in this mode, platen 11 must be fitted with a removable, sliding seal 17, to prevent air leakage in the clearance spaces between platen 11 and frame 3 and sideboard 6. The seal 17 must prevent air leakage and also slide easily along the sideboard 6 and frame 3 as the platen moves downward. With a vacuum at port 8, atmospheric pressure on platen 11 applies a uniform compaction force on the web.

Figure 6:
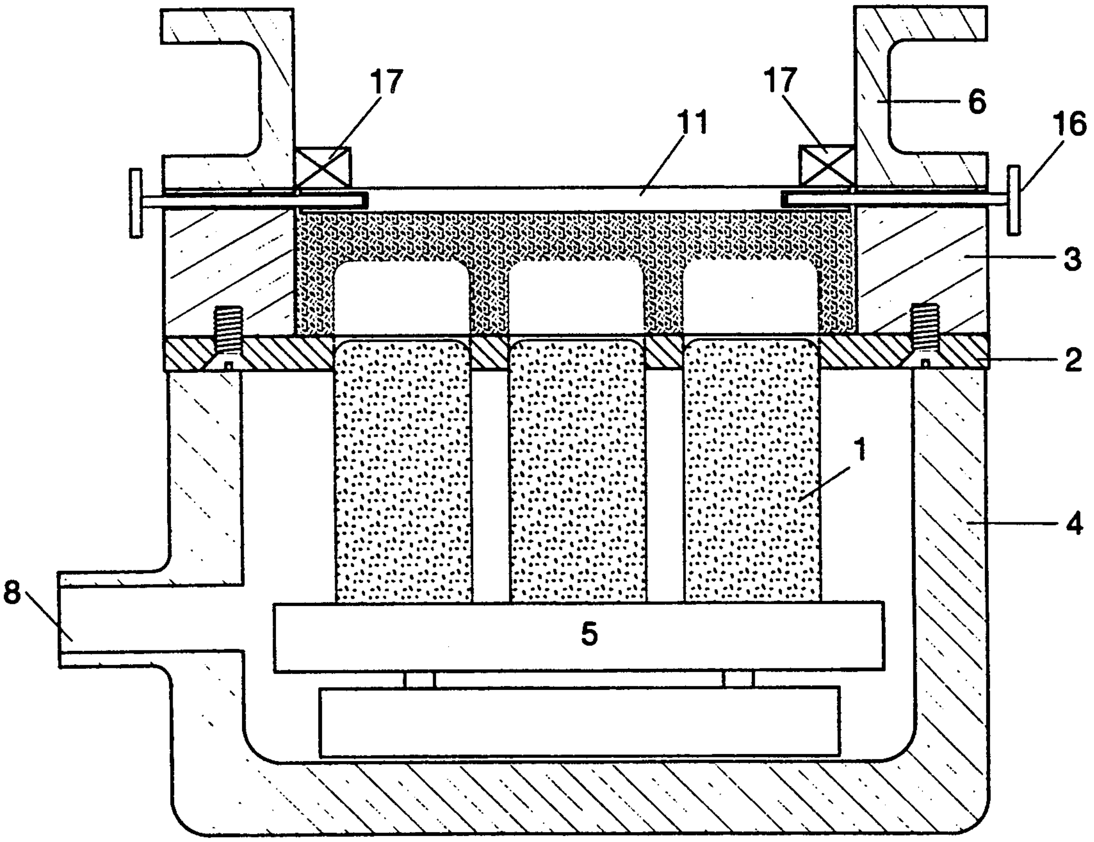

In FIG. 6, the initial consolidation of the web is complete. Platen 11 is temporarily locked to frame 3 by locks 16 and mandrels 1 have been fully retracted from the web. At this time, the web has been compressed in the vertical direction only. Examining FIGS. 4, 5, and 6, it is apparent that the combined effect of the platen and mandrel movements is to compress both the area between the mandrels and the area over the top of the mandrels. By so coordinating the platen and mandrel movements, it is possible to compress the face and ribs at the same compression ratio.

Platen 11 is temporarily locked to frame 3 by locking pins 16. Mandrels 1 have been fully retracted from the web. The locking pins 16 are inserted through a hole in frame 3 and into associated holes in platen 11 when the web has been compressed to the proper thickness. Because the fiber tends to spring back upon removal of the compressing force F, it is necessary to so lock platen 11 to frame 3 to maintain the fiber mat in a compressed state.

Knowing that a dry compressed mat of fibers will tend to expand (springback) if the compressing force is relieved, it should be apparent in FIG. 6 that the portion of the web formed over the top of the mandrel will tend to spring back when the mandrels are withdrawn. This tendency to spring back limits the extent of compression which can be accomplished prior to removal of the mandrels. If the web is fully compressed prior to removal of the mandrels, the portion over the mandrel will spring back and disrupt the integrity of the web when the mandrel is withdrawn.

Examining FIGS. 4 and 5, it is apparent that the combined effect of the movement of the platen 11 and the mandrels 1 is to compress both the area between the mandrels 1 (i.e. the ribs of the final panel) and the area over the top of the mandrels (facing).

Figure 12A:
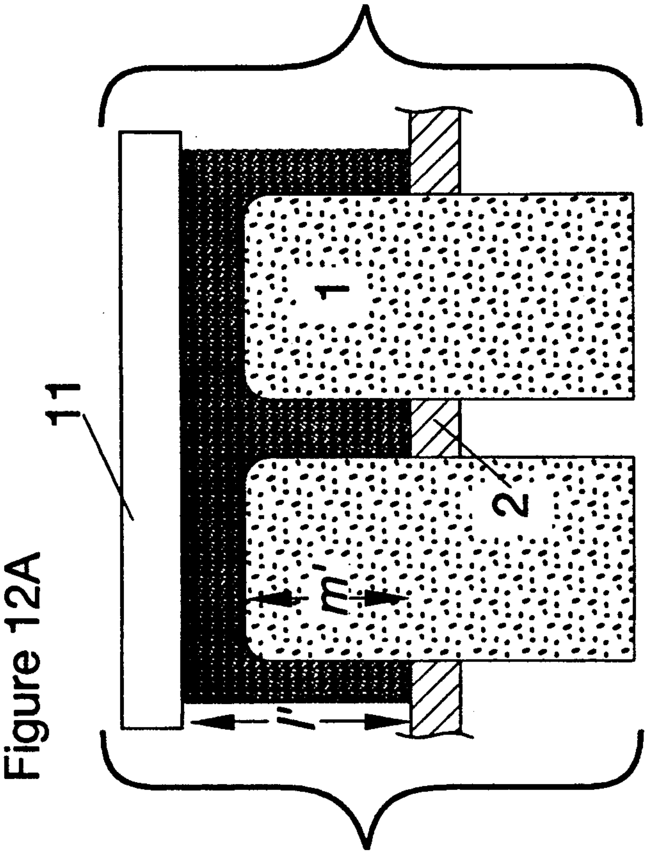
FIG. 12 illustrates an underlying concept used in the invention.
Figure 12:
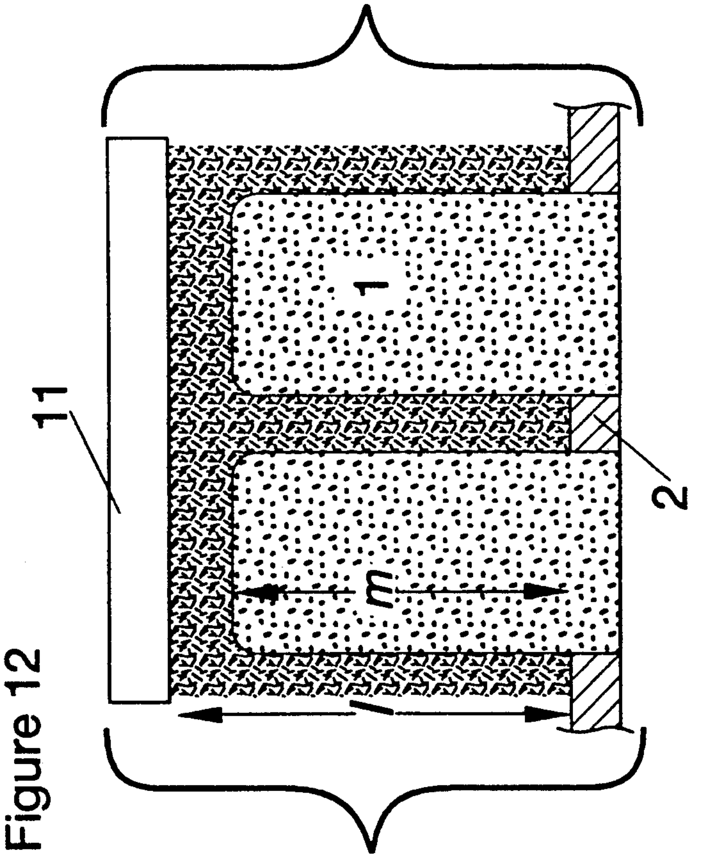

This aspect of the invention is illustrated in more detail in FIG. 12 where in the platen, mandrel and dry furnish are depicted in initial and partially compacted states.

The height of the rib is shown to be initially m and subsequent m'. Rib compaction ratio is, therefore m/m'. Facing thickness is initially 1−m and subsequently 1'−m'. Facing compaction ratio is, therefore 1−m/1'−m'. The relative compaction of rib to facing may be expressed as follows:

$$k = \frac{m/m'}{1 - m/1' - m'} \text{ or } k = \frac{1'm - mm'}{1m' - mm'}$$

If rib and facing are equally compacted, $k = 1.0$ if the ribs are to be more densely compacted than the facing, then $k > 1.0$. If the facing is to be more dense than the ribs, then $k < 1.0$. The means by which the displacements of platen and mandrel are controlled to achieve desired compaction ratios is schematically illustrated in FIG. 13.

Figure 13:
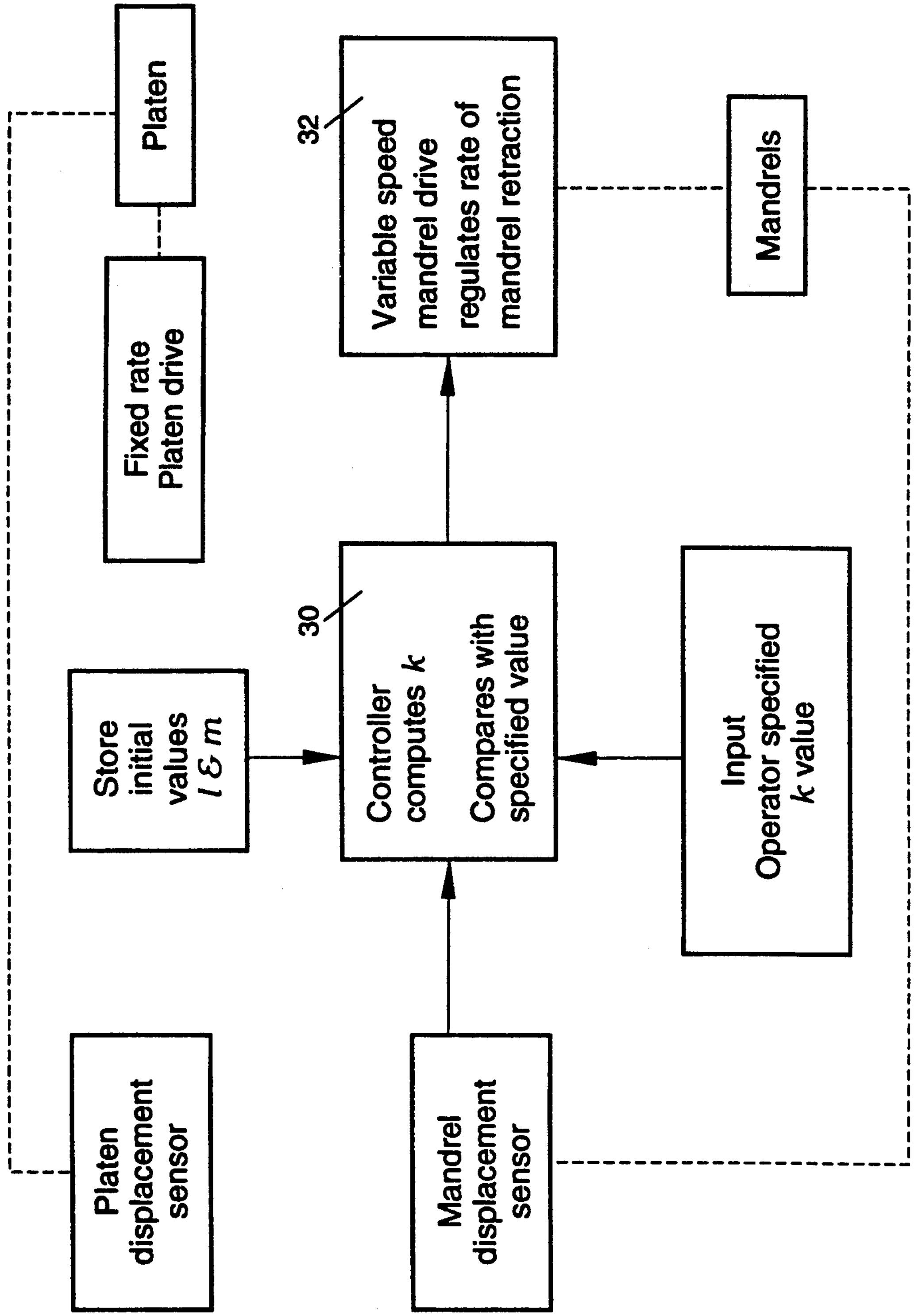
FIG. 13 is a diagram illustrating the manner of operation of certain portions of the invention.

Referring to FIG. 13, displacement sensors monitor the initial and all subsequent positions of the platen 11 and mandrels 1 relative to the perforated plate 2. Initial values of (1) and (m) are stored for subsequent computation of the rib to face compaction ratio (k) as the consolidation process begins. While the platen is lowered at a constant rate by the fixed rate platen drive, values of 1' and m' are used by the controller 30 to compute a (k) values which is then compared with the value specified by the operator.

The controller 30 repeatedly directs the variable speed mandrel drive 32 to adjust the rate of mandrel retraction (thereby adjusting the m' value) to achieve the desired k value—i.e., the desired relative compaction of rib and face sections.

Figure 7:
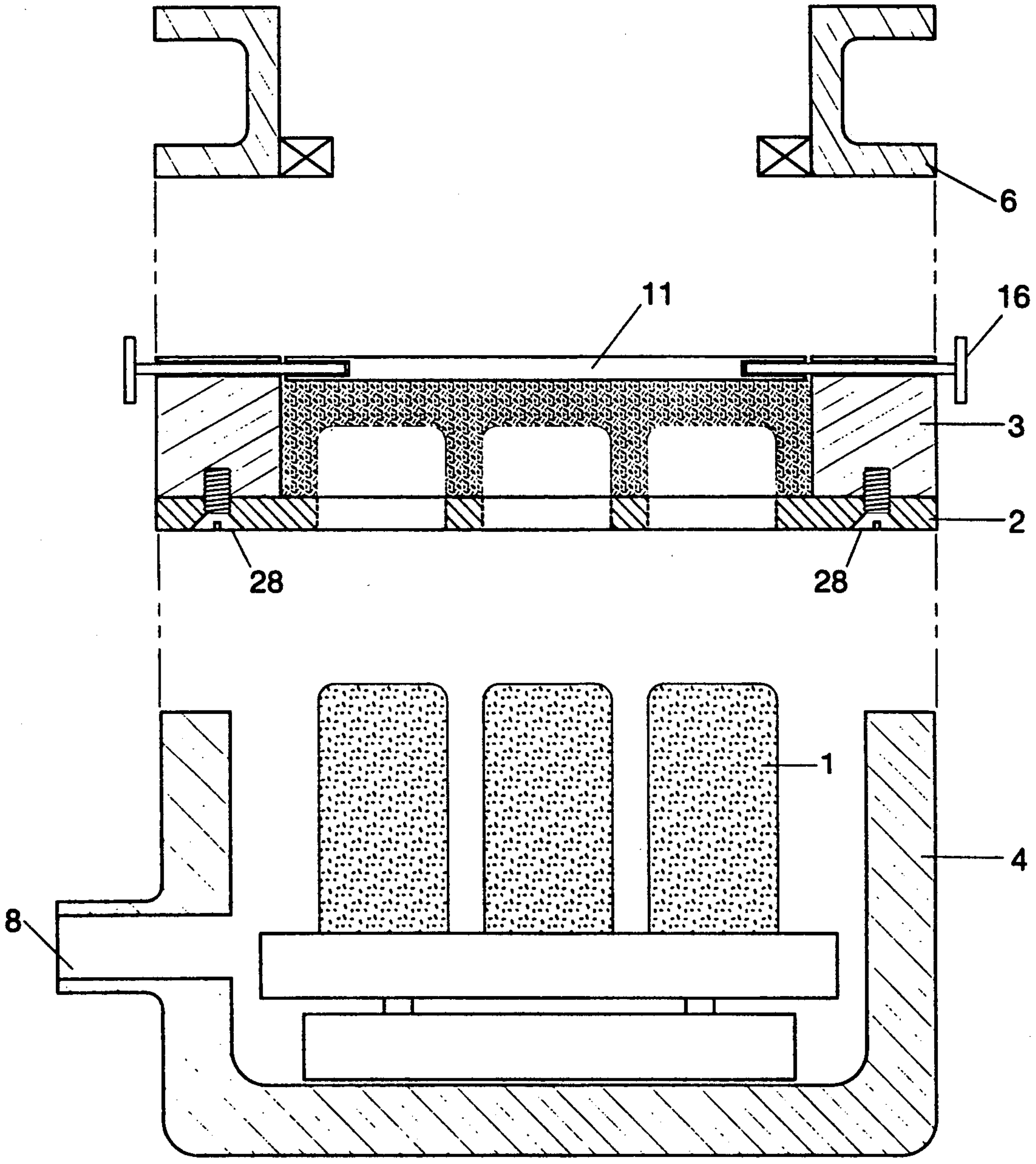

FIG. 7 shows how the web is next removed from the mold for further densification and curing. Platen 11 is locked to frame 3 by locks 16. Frame 3 is affixed to perforated plate 2 by screws 28. It is thus possible to lift the pressing assembly comprising these mold components and the consolidated web from the mold. This leaves the main machinery available to form more mats using another set of the simpler parts including plate 2, frame 3 and sideboards 2. The invention thus has the further benefit of maintaining continuous control, restraint, and support of the as yet not cured mat or web from the time when it is formed until it is fully cured.

Figure 8:
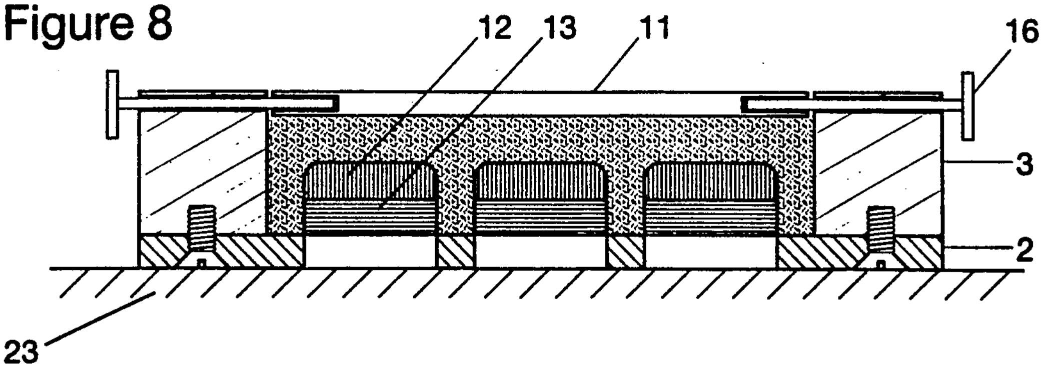
Figure 9:
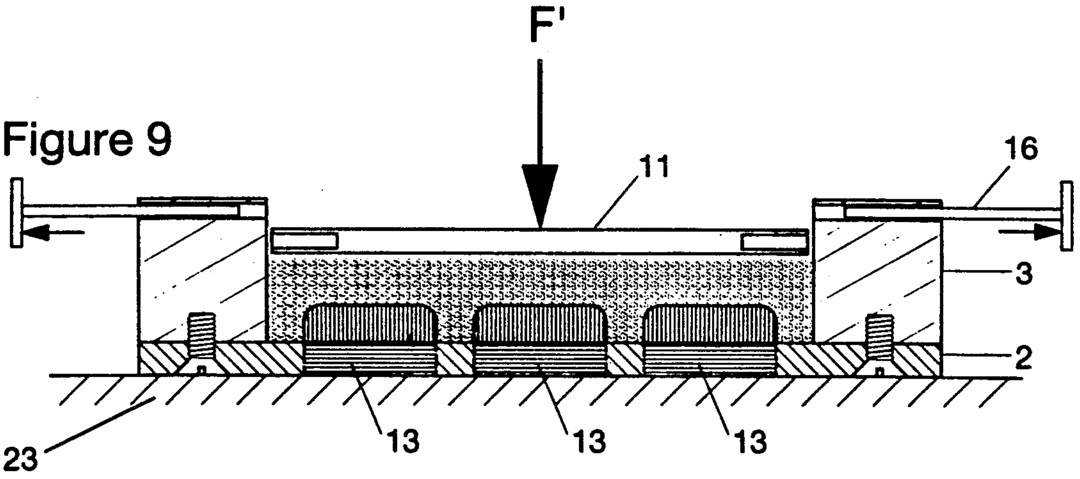
Figure 10:
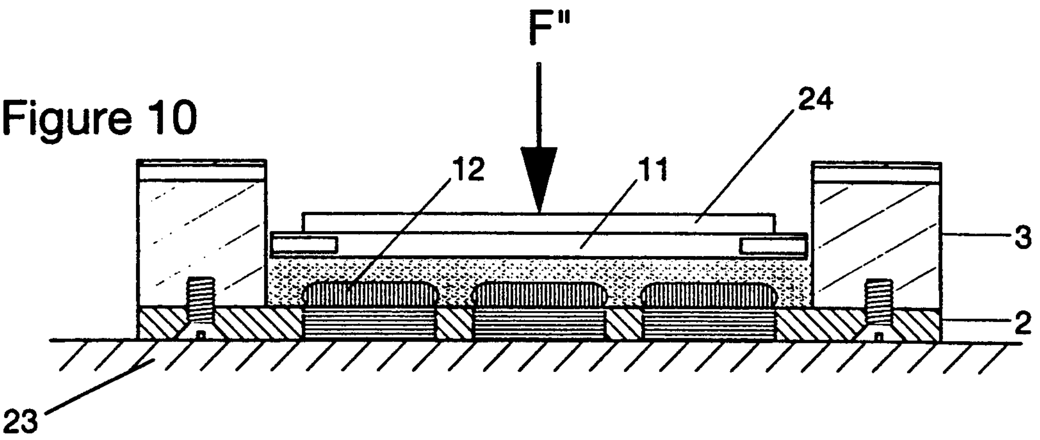

FIGS. 8, 9 and 10 show how the partially formed web is then further densified and its adhesive cured, all of which is done off of the mold.

In FIG. 8, silicone rubber pillows 12 and rigid blocks 13 have been inserted into each of the "pockets" or cavities which had been created by the forming mandrels 1 in FIG. 5, and which were subsequently vacated when the mandrels were withdrawn as shown in FIG. 6. Each pillow 12 and block 13 is inserted into the web through the corresponding hole which exists in the perforated plate 2. Plate 2 is shown in cross-section to show the mandrel holes. A slight interference between the web and both pillow and block hold the pillows and blocks in place.

In FIG. 9, a further consolidating force F' is being applied to platen 11 while the perforated plate 2 is firmly supported on a suitable base plate 23 or the like. The locking means 16 which held platen 11 in frame 3 have been released. FIG. 9 illustrates that during this phase, the force applied to the platen 11 and the resulting further consolidation of the web have caused the rigid blocks 13 to move downward out of the fiber web, and into the corresponding holes in perforated plate 2. The rigid blocks 13 then rest upon the same support surface 23 as the perforated plate 2.

Figure 14:
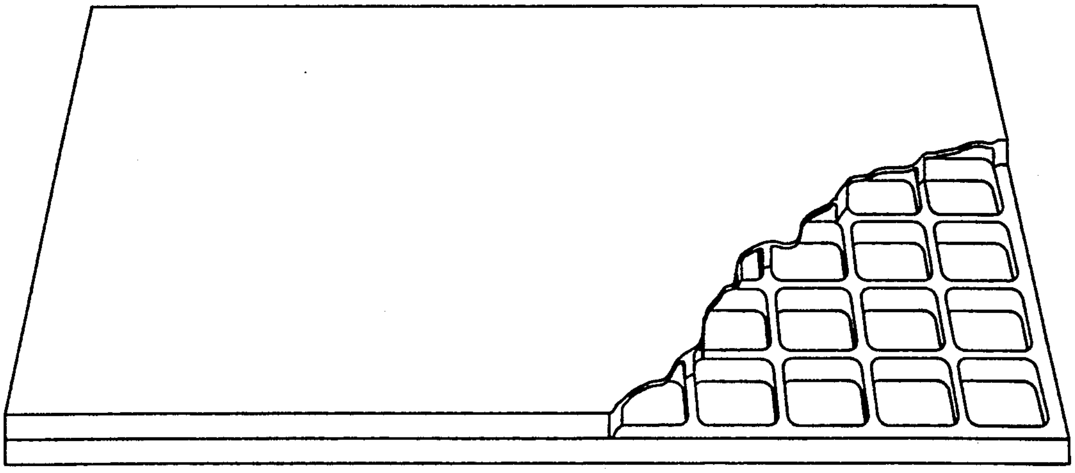
FIG. 14 is a showing of a product produced in accordance with the invention.

In FIG. 10, a still greater consolidating force F'' is applied to platen 11. In this step, the silicone rubber pillows 12 deform so as to create essentially equal pressure in all directions throughout the web. Depending on the force applied, and the particular furnish used, densities from 0.6–1.0 g/cm$^3$ can be practically achieved throughout the web. At this stage, the temperature of the web is raised by heat conducted from heater 24 through the platen 11 and perforated plate 2. Heater 24 could be electric, hot air or steam heated. Typically, the temperature of the platen 11 and perforated plate 2 would be raised to about 325°–375° F. for about 10 minutes to cure the adhesive resin previously applied to the wood fibers. When the adhesive resin applied to the fibers has cured, the force F'' can be removed and the panel withdrawn from the frame 3. A typical finished product is shown in FIG. 14. The web will retain the shape and density achieved during the pressing and curing process. Silicone rubber blocks 12 will revert to their original shape and can be easily removed from the panel—to be used again in fabrication of additional panels.

Use of the deformable rubber pillow blocks for the final compression stage follows the concepts taught in the Setterholm and Hunt U.S. Pat. No. 4,702,870. The function is the same as that shown in FIGS. 3–8 of that patent.

The invention requires a different approach, however, because the deep section of dry formed webs cannot be formed on the rubber mold inserts, as is described herein.

The invention forms the mat on the porous mandrels 1 and partially compacts the web as in FIGS. 4 and 5. The invention removes the mandrels at this point and inserts the rubber pillow and a solid block into each mandrel cavity. The block provides an additional "stage" of vertical compaction of the face and ribs before the pillows begin to deform. This step is essential. If the web is compacted too much before the mandrel is removed (ref. FIGS. 4 and 5), the compressed (but as yet unbonded) ribs will (under the force of stored, internal, compressive energy) distort and collapse when the mandrels are removed (FIG. 6) Yet, if the web is not sufficiently well compacted at the time the rubber pillows begin to deform, there will be excessive distortion of the pillows and the ribs will be distorted and/or poorly compacted. The two-step process of FIGS. 8–10 provides the needed first step of rib compression (without pillow distortion) as the blocks slide into place in the recesses of plate 2 followed by the high pressure final compaction and curing of FIG. 10. The combined functioning of sliding block and subsequent pillow compression provide the essential functions of secondary rib compression (with integral support in place), and final pillow compaction.

Figure 11:
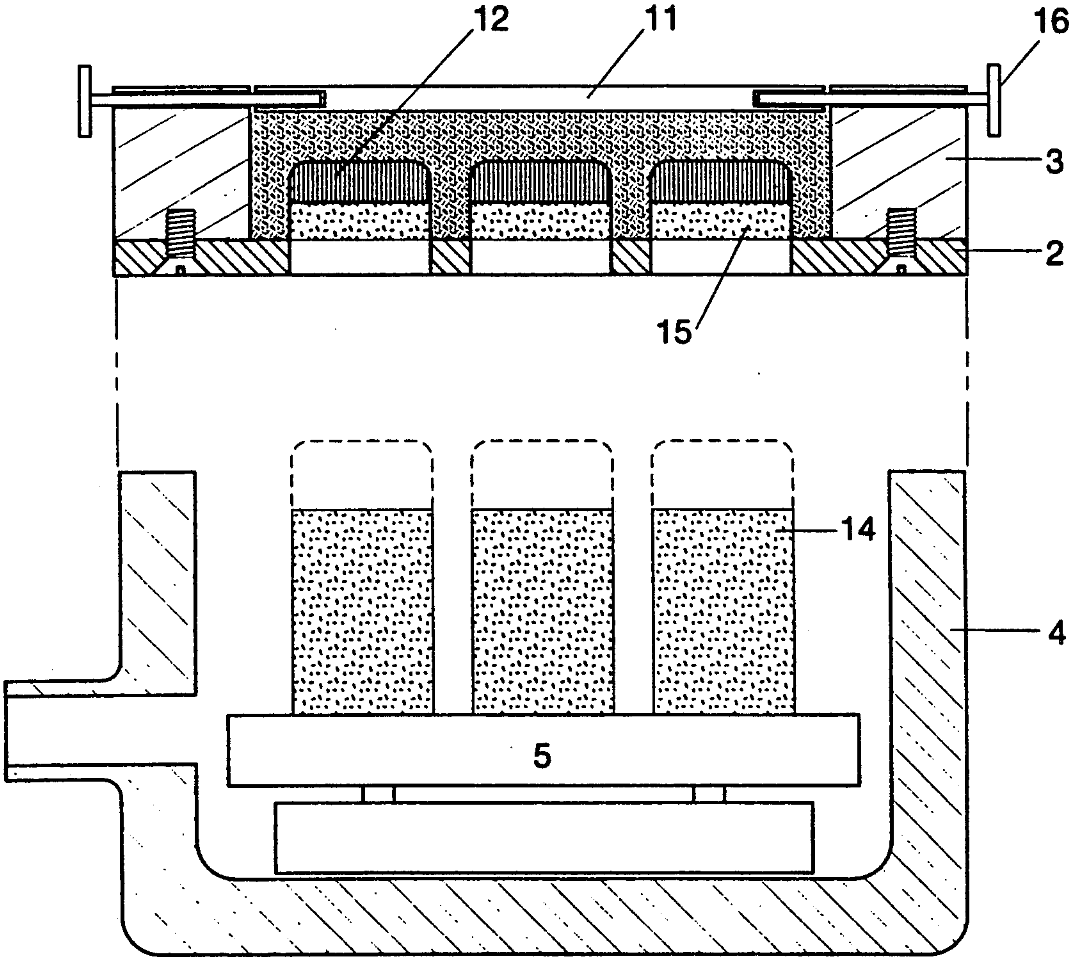
FIG. 11 is a schematic drawing which illustrates a second embodiment.

FIG. 11 depicts an alternate configuration in which the silicone rubber pillows 12 and blocks 13 of FIG. 8 are made as a separable component part of the porous mandrels 1 of FIGS. 1–10. In this alternate design, a porous segment 15 and silicone rubber block 12 are part of the forming mandrel. These components are left in the web when the forming mandrels are withdrawn. This arrangement eliminates the operations necessary to insert the silicone rubber pillow 12 and rigid block 13 into the web as depicted in FIG. 8 and described above. FIG. 11 shows the elevator assembly 5 of FIGS. 1–10 in a fully retracted position within the base 4. A truncated porous mandrel 14 is shown in lieu of porous mandrel 1 of FIGS. 1–10. The phantom lines above the truncated mandrel 14 indicate where the porous segment 15 and silicone rubber block 12 would be positioned during the web forming phase.

Figure 15:
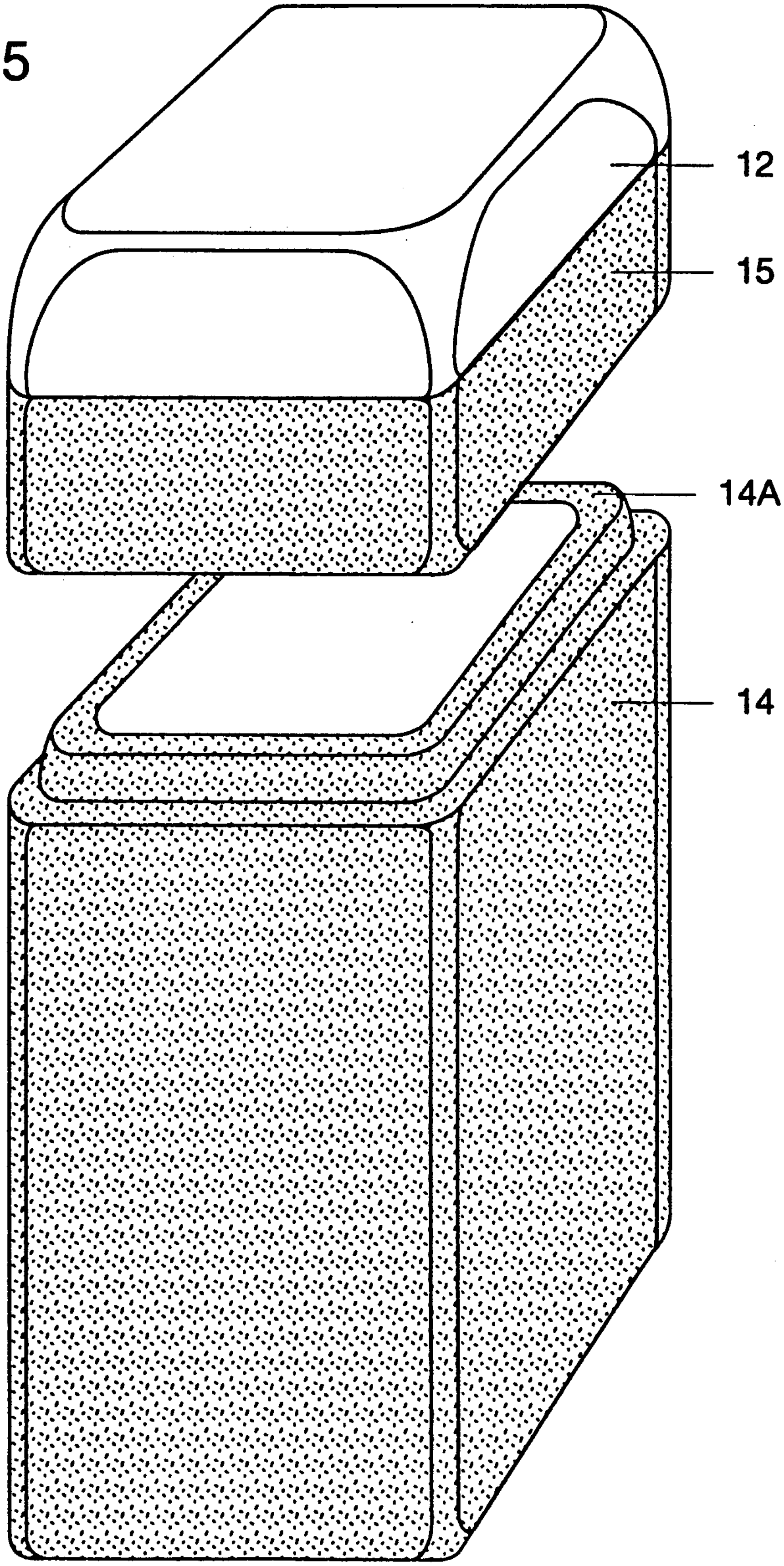
FIG. 15 is a showing of a detail.

Referring to FIG. 15, a detailed drawing of the mandrel assembly 14 of FIG. 11, the means by which this can be accomplished is shown. The porous truncated mandrel 14 and block 15 can be made of the same porous material. A ridge 14A on the top of the truncated porous mandrel 14 engages a corresponding recess not shown in the bottom of the block 15. Parts 14 and 15 thus mate or engage so that their four sides are aligned and they cannot rotate with respect to one another about a vertical axis. The pillow 12 is molded to shape and permanently bonded to the top surface of block 15 as by a suitable adhesive. Comparing FIG. 11 with FIG. 7, note that the rib sections which are entirely without lateral support in FIG. 7 are supported by the block and pillow in FIG. 11.

The pillow/block assembly 12, 15 need not be mechanically attached or fastened to the trancated porous mandrel 14 during either the forming or compaction procedure. During the web compaction process, it will be pushed onto the top of the mandrel by the force of the descending platen 11. However, once the compaction process is over (at FIG. 5, for example), the assembly 12, 15 will be left in the web as the mandrel is fully withdrawn. Because the block 15 (referring to FIG. 15) is of the same porous material as the truncated porous mandrel 14, the only loss to porous flow is that relatively small surface area comprising the surface of the pillow. Loss of vacuum surface here is relatively insignificant because the upper surface (face) is the easiest to form.

This configuration of components expedites processing and reduces handling the molded web. The pillow and block are thus inserted in the web as it is being formed, thus eliminating the need for retraction of the whole mandrel and subsequent reinsertion of block and pillow. This configuration has the further advantage of providing additional support to the loosely consolidated web structure—reducing the "springback," which occurs when the whole mandrel is removed.

FIG. 11 corresponds to FIG. 7 wherein the web is removed from the mold for final densification and curing. Platen 11 is locked to frame 3 and frame 3 is affixed to perforated plate 2, both as in the first embodiment. The pressing assembly comprising platen 11, frame 3, plate 2 and the web, is removed from the mold as in FIG. 7. In FIG. 11, however, the rigid and elastic components 15 and 12 respectively, are retained in the assembly and the web can go directly to the pressing operations shown in FIGS. 9 and 10.

The pillow and block combination together support the loosely consolidated web during the consolidation shown in FIGS. 9 and 10. In this step, there is "one-dimensional consolidation in the thickness direction only. As the web sections between the pillows and blocks compress, the blocks move into the corresponding voids in the perforated plate—accommodating the consolidation of the web without distortion of the elastic pillows. Once the blocks are fully positioned and receded into the corresponding spaces in the perforated plate, they provide the supporting surface for final densification of the web depicted in FIG. 10.

A significant benefit of the invention as shown at FIGS. 7 and 11 is that once the web is formed and initially compressed, plate 2, frame 3, and plate 11 are removed. The remainder of the forming assembly can be fitted with a new plate 2, frame 3, and platen 11 to start the forming process once again. Thus, the major portion of the apparatus (mandrels 1, base 4, elevator assembly 5, sideboards 6, and forming hood 7) can be used again and again to mold more sculptured webs, while already formed webs receive final pressing and heat curing of the adhesive, off of the main molding apparatus.

While the invention has been described in some detail above, it is to be understood that this detailed description is by way of example only, and the protection granted is to be limited only by the spirit of the invention and the scope of the following claims.

We claim:

1. A method of forming a product of wood fiber, said product having non-uniform cross-sectional shapes and a substantially uniform density, comprising the steps of pretreating said wood fiber with adhesive, providing mold means, providing movable porous mandrels within said mold means, providing removable perforated plate means in said mold means through which said mandrels may move, providing removable compacted mat forming means on said plate means, causing an air flow through said mold means and said mandrels, supplying said pretreated wood fiber in a dry condition into said air flow to cause said wood fibers to deposit in the spaces between said mandrels on said plate means while said mandrels on said plate means while said mandrels are in a first position in said mold means, first compacting said deposited wood fiber, repeating said air flow step and said supplying wood fiber step while said mandrels are in a second position in said mold means, again compacting said wood fiber while simultaneously moving said mandrels out of contact with the thus compacted mat of wood fiber, removing said mat with said plate means and said frame means from said mold means with said mat being held in said compacted condition by said plate means and said frame means, and completing the forming of said product from said mat by inserting a rubber pillow and a solid block into the cavity and producing additional vertical compaction before deforming the pillow on said mat using said frame means and said plate means externally of said mold means.

2. The method of claim 1, wherein said first compacting step is performed by opening said mold means and using compacting means separate from said mold means.

3. The method of claim 1, providing platen means for compacting said mat, and performing said again compacting step by causing predetermined coordinated motions of said mandrels and of said platen means.

4. The method of claim 1, positioning said removable plate means in said mold means so as to divide said mold means into two spaces, positioning said porous mandrels in one of said spaces and so as to extend through said plate means and to thus be located in both of said spaces, and said causing air flow steps being performed by providing vacuum pressure in one of said spaces.

5. The method of claim 1, providing platen means for compressing said mat, and performing said again compacting step by providing vacuum pressure through said mat to one side of said platen means to thereby cause atmospheric pressure on the other side of said platen means to at least assist in performing said again compacting step.

6. The method of claim 5, wherein a mat compression force in the range of about 10 to about 12 psi is generated as a result of said providing vacuum pressure step.

7. The method of claim 1, and performing said completing the forming step by the steps of providing platen means to compress said mat between said platen means and said plate means, inserting resilient pillow means and rigid block means through the mandrel openings in said plate means and into the cavities formed by said mandrels in said mat, applying mat consolidation force onto said platen means to urge said blocks into the openings in said plate means, applying increased mat consolidation force onto said platen means to cause said pillow means to deform to thereby apply substantially equal pressure in all directions throughout said mat, heating said mat to cure the adhesive on said wood fiber, removing the finished product by removing said platen means, said frame means and said plate means from around said now cured mat and by removing said pillow means from the openings in said now cured mat, and re-using said frame means and said plate together with said mold means and said pillow means, said block means and said platen means to form additional mats.

8. The method of claim 7, wherein said heating step is performed by raising the temperature of said mat above 250° for about 10 minutes.

9. The method of claim 7, wherein said force application steps are performed so as to achieve densities in said mat in the range of about 0.6 to about 1.0 g/cm$^3$.

10. The method of claim 7, wherein said step of inserting resilient pillow means and rigid block means is performed by providing removable ends of said mandrels, wherein said removable ends consist of said pillow means and said block means mounted on said mandrels, however, when said mandrels are removed said pillow means and said block means remain in the cavities which said mandrel, said pillow means, and said block means formed together in said mat.

* * * * *